Figure 1:
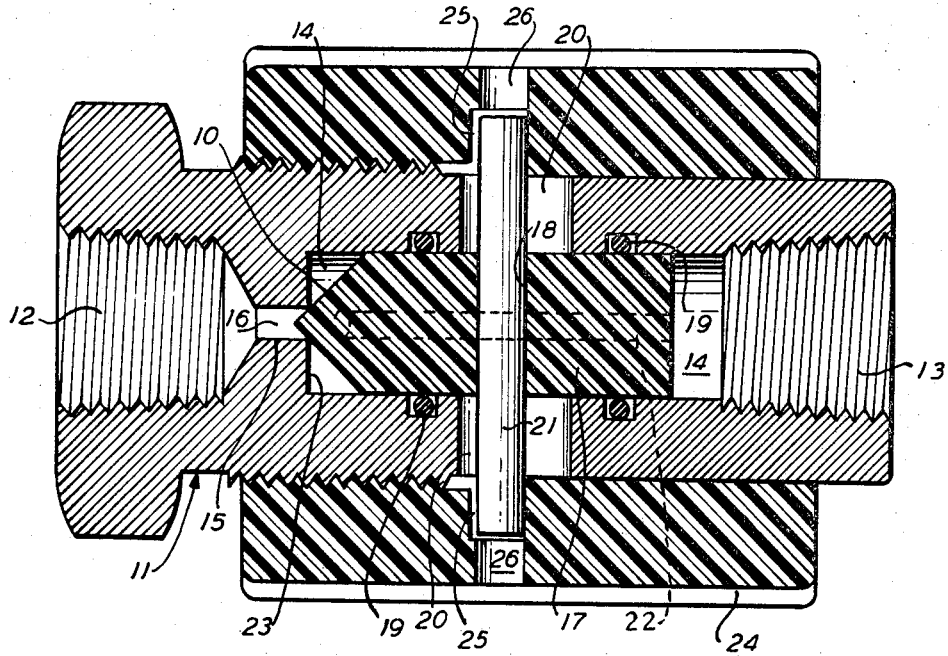

Feb. 6, 1968  G. T. STERN  3,367,626

VALVE

Filed May 11, 1965

INVENTOR
GEORGE T. STERN
BY Norman N. Popper
ATTORNEY

United States Patent Office 3,367,626
Patented Feb. 6, 1968

3,367,626
VALVE
George T. Stern, 4 Cromwell Drive W.,
Morristown, N.J. 07960
Filed May 11, 1965, Ser. No. 454,932
3 Claims. (Cl. 251—340)

The invention relates generally to valves, and particularly to linear valves.

It is an object of the invention to provide a valve which generally conforms to the external surface of a conduit and may be inserted therein to control the flow of material in the conduit.

It is another object of the invention to provide a linear valve whose poppet or plug engages the seat without torsional movement.

It is another object of the invention to provide a valve, that is relatively inexpensive, durable, simple, easy to install, and whose engaging surfaces are not quickly subject to scarification.

Figure 2:
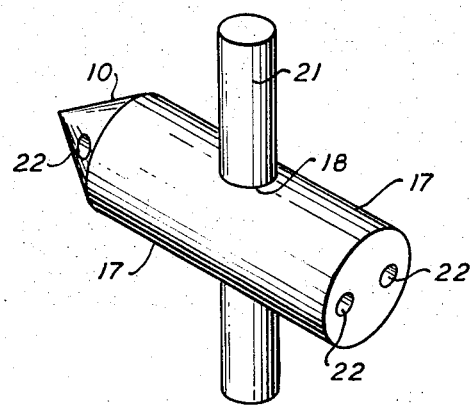

These objects and advantages as well as other objects and advantages may be attained by the device shown by way of illustration in the drawings in which:

FIGURE 1 is a vertical sectional view; and
FIGURE 2 is a perspective view of the poppet and pin, separated from the housing.

It has been found that a simple linear valve, with few parts can be made relatively inexpensively, with a long-lived poppet which linearly and axially, without torsional movement, will engage a valve seat, without the surface scoring and deterioration usually attendant upon valves whose plugs rotate into engagement with a valve-seat.

Referring now to the drawings in detail, the valve provides a generally tubular housing 11. There are internal threaded end portions 12, 13 for connecting the valve in a line. An axial bore 14 connects the portions 12, 13. At one end of the bore 14, there is a constriction 15 which delineates a short narrowed passage 16. A plug or poppet 17 is introduced into the bore 14 through the threaded portion 13. This plug 17 has a vertical, diametrical passage 18. The diameter of the plug 17 is such that it fits snugly in the bore 14. The end 10 of the plug 17 opposite the narrowed passage 16 is formed to engage the entrance to the passage 16 and to seal it. A preferred form for the end of the plug 17 is conical, as shown in the figures, but other shapes may be used, as long as they meet, engage and seal the circumferential edges of the entrance to the passage 16. In order to prevent leakage of fluid passing through the bore 14, the O-rings 19 are placed in annular channels in the housing 11 to engage the plug 17. Longitudinally elongated, diametrical, slots 20 in the housing 11 are thereby isolated, and nothing may leak into them, from the bore 14, past the plug 17. A pin 21 inserted in the vertical passage 18, extends through these elongated slots 20, 20 and can be manipulated to seat and unseat the end 10 of the plug 17 from the passage 16. The plug 17 is provided with one or more offset passages or bores 22, 22 which are out of alignment with the narrowed passage 16. When the plug 17 is manipulated by moving the pin 21 to have its end 10 engaged with the entrance to the narrowed passage 16, the passage 16 is sealed, and fluid passing through the bores 22 is trapped between the plug 17 and the wall 23. Likewise, flow in the opposite direction would be stopped by the seated end 10; when the end 10 is unseated, flow may pass through the passage 16, enter the bore 14 and move through the offset passage 22.

The manipulation of the poppet 17 can be most conveniently controlled by an internally threaded, annular knob 24, which is threaded onto an external thread on the housing 11. The knob 24 has an annular internal channel 25 which accommodates the ends of the pin 21. Diametrical passages 26, 26 communicate from the outer surface of the knob 24 with the annular internal channel 25. The passages 26, 26 permit the insertion of the pin 21 to the point where its outer ends lie wholly within the annular channel 25. The knob 24 can then be rotated, the pin 21 will be moved longitudinally in the slots 20, without any torsional movement of the poppet 17. The poppet 17 will be reciprocated longitudinally, without any torsional movement. Since the plug 17 does not rotate against the entrance to the passage 16, the end 10 is not scored and the sealing engagement of the plug 17 with the entrance to the passage 16 remains unimpaired over long periods of time, unlike plugs which operate in a torsional manner.

The plug or poppet 11 may be made of some durable plastic material such as nylon, or Teflon. The housing 11 may be made of metal. In both cases, other materials may be successfully used.

The poppet 11 is balanced against pressure and requires very little force on the knob 24 to open and close it.

The foregoing specification is intended merely to illustrate an embodiment of the invention, for many changes may be made in the construction, selection, and arrangement of the parts, all within the scope of the appended claims without departing from the spirit of the invention.

What is claimed:
1. A valve comprising:
   (a) a generally tubular housing;
   (b) a constriction in the tubular housing defining a narrowed passage;
   (c) a plug in the housing movable to seal the narrowed passage;
   (d) an offset bore in the plug out of alignment with the narrowed passage;
   (e) a longitudinally elongated slot in the tubular housing;
   (f) a pin engaged with the plug and extending through the slot, passing beside the offset bore;
   (g) sealing means inside of the housing on both sides of the slot, engaging the plug;
   (h) means to reciprocate the pin in the slot whereby the plug is linearly and axially manipulated.
2. A valve comprising:
   (a) a generally tubular housing;
   (b) a constriction in the tubular housing defining a narrowed passage;
   (c) a plug in the housing movable to seal the narrowed passage;
   (d) an offset bore in the plug out of alignment with the narrowed passage;
   (e) a longitudinally elongated slot in the tubular housing;
   (f) a pin engaged with the plug passing beside the offset bore and extending through the slot;
   (g) sealing means inside of the housing on both sides of the slot, engaging the plug;
   (h) a knob on the housing and in threaded engagement therewith;
   (i) an annular passage in the threaded knob engaged with the end of the pin, whereby rotation of this knob will move the pin axially and seat or unseat the plug.
3. A valve comprising:
   (a) a valve housing;
   (b) a seat in the housing;

(c) a plug in the housing;
(d) means engaged with the plug to impart linear movement to the plug, to seat and unseat it;
(e) a knob on the housing in threaded engagement therewith;
(f) an annular channel on the inner surface of the knob engaging the means;
(g) a longitudinally elongated slot in the housing to permit axial movement of the means;
(h) a passage in the housing communicating with the seat;
(i) a pair of bores in the plug offset from the passage in the housing when the plug is engaged with the seat;
(j) the means being a pin passing through the plug beside the offset bores without intersecting therewith.

References Cited

UNITED STATES PATENTS

| 2,126,856 | 8/1938 | Yancey | 251—340 |
| 2,245,097 | 6/1941 | Tobler | 251—340 |
| 2,637,572 | 5/1953 | Bruce | 251—340 X |
| 2,920,860 | 1/1960 | Anderson | 251—340 |
| 2,939,675 | 6/1960 | Karder | 251—340 X |
| 3,093,155 | 6/1963 | Dawes | 251—340 X |
| 3,179,371 | 4/1965 | Charlop | 251—325 X |

FOREIGN PATENTS

| 716,500 | 1/1942 | Germany. |

M. CARY NELSON, *Primary Examiner.*

S. SCOTT, *Assistant Examiner.*